United States Patent
Schubel et al.

(10) Patent No.: US 12,420,500 B2
(45) Date of Patent: Sep. 23, 2025

(54) METHOD AND PATCH FOR DEFECT REPAIR

(71) Applicant: University of Southern Queensland, Toowoomba (AU)

(72) Inventors: Peter Schubel, Springfield Central (AU); Xuesen Zeng, Springfield Central (AU); Paul Callus, Fishermans Bend (AU)

(73) Assignee: University of Southern Queensland (AU)

(*) Notice: Subject to any disclaimer, the term of this patent is extended or adjusted under 35 U.S.C. 154(b) by 580 days.

(21) Appl. No.: 16/921,322

(22) Filed: Jul. 6, 2020

(65) Prior Publication Data

US 2021/0154956 A1    May 27, 2021

(51) Int. Cl.
| | |
|---|---|
| *B32B 5/18* | (2006.01) |
| *B29C 73/10* | (2006.01) |
| *B32B 5/14* | (2006.01) |
| *B32B 15/04* | (2006.01) |

(52) U.S. Cl.
CPC .......... *B29C 73/10* (2013.01); *B32B 5/14* (2013.01); *B32B 15/04* (2013.01); *B32B 2305/38* (2013.01); *B32B 2556/00* (2013.01)

(58) Field of Classification Search
None
See application file for complete search history.

(56) References Cited

U.S. PATENT DOCUMENTS

| | | |
|---|---|---|
| 6,174,392 B1 | 1/2001 | Reis |
| 8,209,838 B2 | 7/2012 | Lindgren |
| 8,218,852 B2 | 7/2012 | Cork et al. |
| 8,409,384 B2 | 4/2013 | Dan-Jumbo et al. |
| 8,442,665 B2 | 5/2013 | Krause |
| 8,449,703 B2 | 5/2013 | Dan-Jumbo et al. |
| 8,524,020 B2 | 9/2013 | Lindgren et al. |
| 8,677,625 B2 | 3/2014 | Roux et al. |
| 9,314,979 B1* | 4/2016 | Dan-Jumbo ............ B32B 43/00 |
| 9,672,661 B2 | 6/2017 | Marche |
| 9,827,716 B2 | 11/2017 | Laudrain |
| 9,919,444 B2 | 3/2018 | Tomblin et al. |

(Continued)

FOREIGN PATENT DOCUMENTS

| | | | |
|---|---|---|---|
| CN | 104742310 A * | 7/2015 | ............ B29C 45/14 |
| WO | 2015050634 A1 | 4/2015 | |

OTHER PUBLICATIONS

Xiaojia He, machine translation of CN 104742310, Jul. 1, 2015 (Year: 2015).*

(Continued)

*Primary Examiner* — Mary I Omori
(74) *Attorney, Agent, or Firm* — Dureska & Moore, LLC; David P. Dureska; David J. Danko (57) ABSTRACT

A patch (100) for repair of a structure (180) with a defect (182) having a topography, the patch (100) including:

a patch body (102) that is at least partially metallic;

a bonding surface (104) that is compatible with the topography of the defect (182); and a patch surface (106) opposite the bonding surface (104), wherein the patch (100) has a variable porosity and a set of material properties; and wherein at least one material property of the set of material properties varies as a result of the variable porosity.

15 Claims, 9 Drawing Sheets

(56) References Cited

U.S. PATENT DOCUMENTS

| | | |
|---|---|---|
| 10,265,915 B2 | 4/2019 | Urban |
| 10,293,576 B2 | 5/2019 | Hasan |
| 2010/0012260 A1* | 1/2010 | Brennan ............... B29C 70/545 |
| | | 156/196 |
| 2014/0272248 A1* | 9/2014 | Chamberlain .......... C04B 35/80 |
| | | 156/60 |
| 2018/0133850 A1 | 5/2018 | Vichniakov et al. |
| 2019/0118486 A1* | 4/2019 | Compton ................ B29C 64/10 |
| 2019/0118497 A1 | 4/2019 | Kierbel et al. |

OTHER PUBLICATIONS

Al-Maharma et al., Effects of porosity on the mechanical properties of additively manufactured components: a critical review, Dec. 2, 2020, Materials Research Express (Year: 2020).*

Wang et al., Energy absorption characteristics and preparation of porous titanium with high porosity, 2023, Materials Today Communications, vol. 34, (Year: 2023).*

Skibinski et al., Influnce of Pore Size Varitation on Themal Conductivity of Open-Porous Foams, Jun. 24, 2019 (Year: 2019).*

Kurt C. Frisch Jr., Surfaces, Chemistry & Applications, 2002 (Year: 2002).*

* cited by examiner

METHOD AND PATCH FOR DEFECT REPAIR

CROSS-REFERENCE TO RELATED APPLICATION

This application claims the benefit of Australian Patent Application No. 2019904485 filed Nov. 27, 2019.

FIELD

The present invention relates to a method and patch for defect repair.

BACKGROUND

Composite structures have seen an increased use in commercial airframe construction over the last 20 years. Due to the long lifecycle of commercially used airframes, up to 40 years, an inhibitor to deploying composite structures in a design has been the difficulty in performing repairs to a defect in a composite structure such that the composite structure performs within an acceptable envelope of a design performance. This difficulty arises due to the anisotropy of material properties in a composite structure, which is unavoidable as the anisotropy is a desirable quality in composite materials. A further difficulty of performing adequate repairs is that commercial airframes travel long distances from primary repair facilities to a remote location, such that repairs requiring stationary or complex equipment, such as autoclave processing, to be used on the airframe cannot be deployed at the remote location.

Known approaches, discussed for example in patent publication WO 2015/050634, to applying patches to defects involve the removal of material about the original defect to improve the knowledge of the defect topography (for example, a removal tool path could be used as the data indicative of the defect topography with very high precision).

SUMMARY OF INVENTION

It is an object of the present invention to address or overcome one or more of the above difficulties, or at least provide a useful alternative to the above-mentioned defect repair methods.

In a first aspect the present invention provides a patch for repair of a structure with a defect having a topography, the patch including:
  a patch body that is at least partially metallic;
  a bonding surface that is compatible with the topography of the defect; and
  a patch surface opposite the bonding surface,
  wherein the patch has a variable porosity and a set of material properties; and
  wherein at least one material property of the set of material properties varies as a result of the variable porosity.

Suitably, the set of material properties includes a Young's modulus, a Poisson's ratio, a yield strength, an ultimate tensile strength, and a coefficient of thermal expansion Preferably, the patch body includes a first zone and a second zone, each zone having:
  a porosity; and
  a set of material properties,
  wherein the porosity of the first zone is different to the porosity of the second zone, and as a result, at least one material property of the first zone is different to a material property of the second zone.

Preferably, the first zone includes a first patch layer and the second zone includes a second patch layer, the first and second patch layers being located between the bonding surface and the patch surface, wherein each patch layer is configured so as to be located, when the patch is applied to the structure, adjacent a corresponding structural layer of the structure, and
  wherein the porosity of each patch layer is predetermined so that:
    at least one material property of the first patch layer is more compatible with a first structural layer than a second structural layer; and
    at least one material property of the second patch layer is more compatible with the second structural layer than the first structural layer.

Preferably, the first zone includes a first radial portion and the second zone includes a second radial portion, the first and second radial portions being located at different distances from a central axis of the patch.

Preferably, the second radial portion is located further from the central axis than the first radial portion, and wherein the porosity of the second radial portion is higher than the porosity of the first radial portion.

Preferably, the porosity of the first and/or second radial portion varies such that Young's Modulus varies at a rate between 220 GPa m$^{-1}$ to 1700 GPa m$^{-1}$.

Preferably, the patch further includes a third radial portion intermediate the first and second radial portions, and wherein the porosity of the third radial portion is in a range between the porosity of the first radial portion and the porosity of the second radial portion.

Preferably, the patch surface has a predetermined surface porosity of about 80%.

Preferably, the patch body includes:
  a doubler portion configured to, when the patch is applied to the structure, extend beyond the topography of the defect.

Preferably, the doubler portion has a porosity and a set of material properties, and wherein at least one material property of the doubler portion is predetermined by the porosity.

Preferably, the patch is at least partially manufactured using additive layer manufacturing.

Preferably, the patch body includes a metallic cellular lattice material, the cellular lattice material having a plurality of voids and a metal lattice, the proportion of void volume to metal volume determining the porosity of the metallic cellular lattice material.

Preferably, the void volume and/or the metal volume is predetermined to control the variable porosity.

Preferably, the voids have a void axis that is transverse to the patch surface by a void angle.

Preferably, the void angle varies as a function of a distance from a central axis of the patch.

Preferably, the metal lattice includes at least one of the following structures:
  a honeycomb; and
  a gyroid.

Preferably, a major cross-sectional dimension of a majority of voids in the plurality of voids has a magnitude of less than 1 mm.

Preferably, the patch is made at least partially from Invar 36 or Ti-6Al-4V (Grade 5) or TI-6Al-4V ELI (Grade 23).

Preferably, the variable porosity is predetermined so as to vary as a function of distance from the central axis.

Preferably, the bonding surface has a surface feature for increasing a surface area of the bonding surface to improve adhesion to an adhesive.

Preferably, the surface feature includes a hook, or an extension with a hook-shaped cross-section, extending from the bonding surface.

Preferably, the surface feature includes a plurality of cones extending from the bonding surface.

In a second aspect, the present invention provides a method for repair of a structure having a defect, the method including the steps of:
  acquiring a topography of the defect;
  forming a patch that is at least partially metallic and compatible with the topography of the defect, the patch including:
    a patch body having:
      a variable porosity; and
      a set of material properties;
    a bonding surface that is compatible with the topography of the defect; and
    a patch surface opposite the bonding surface,
    wherein the variable porosity is predetermined so that at least one material property of the set of material properties varies as a result of the variable porosity; and
  applying the patch to the defect using an adhesive layer.

Preferably, the structure is a composite structure having a structural first layer and a second structural layer, and the step of acquiring the topography also includes:
  acquiring information related to a set of material properties of the first and second structural layers, and
  wherein the patch body has a first zone and a second zone, each zone having:
    a porosity; and
    a set of material properties,
  wherein the first zone includes a first patch layer and the second zone includes a second patch layer, the first and second patch layers being located between the bonding surface and the patch surface, wherein each patch layer is configured so as to be located, after application of the patch, adjacent a corresponding structural layer of the structure, and
  wherein the porosity of each patch layer is predetermined so that:
    at least one material property of the first patch layer is more compatible with a first structural layer than a second structural layer; and
    at least one material property of the second patch layer is more compatible with the second structural layer than the first structural layer.

Preferably, the patch body includes a doubler portion and the step of applying the patch further includes:
  applying the patch such that the doubler portion extends beyond the topography of the defect.

Preferably, the step of forming the patch is at least partially performed using an additive layer manufacturing process.

Preferably, the additive layer manufacturing process deposits layers of material in a first plane, and
  wherein the patch body being formed extends in a second plane, the second plane being perpendicular to the first plane.

Preferably, the step of forming the patch includes:
  forming a plurality of patches in a single additive layer manufacturing process.

Preferably, the patch body is formed to include a metallic cellular lattice material, the cellular lattice material having a plurality of voids and a metal lattice, the proportion of void volume to metal volume determining the porosity of the metallic cellular lattice material.

Preferably, the patch is made at least partially from a nickel alloy, preferably Invar 36, or a titanium alloy, preferably Ti-6Al-4V.

BRIEF DESCRIPTION OF DRAWINGS

Preferred embodiments of the present invention will now be described, by way of examples only, with reference to the accompanying drawings.

DESCRIPTION OF EMBODIMENTS

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

Figure 1:
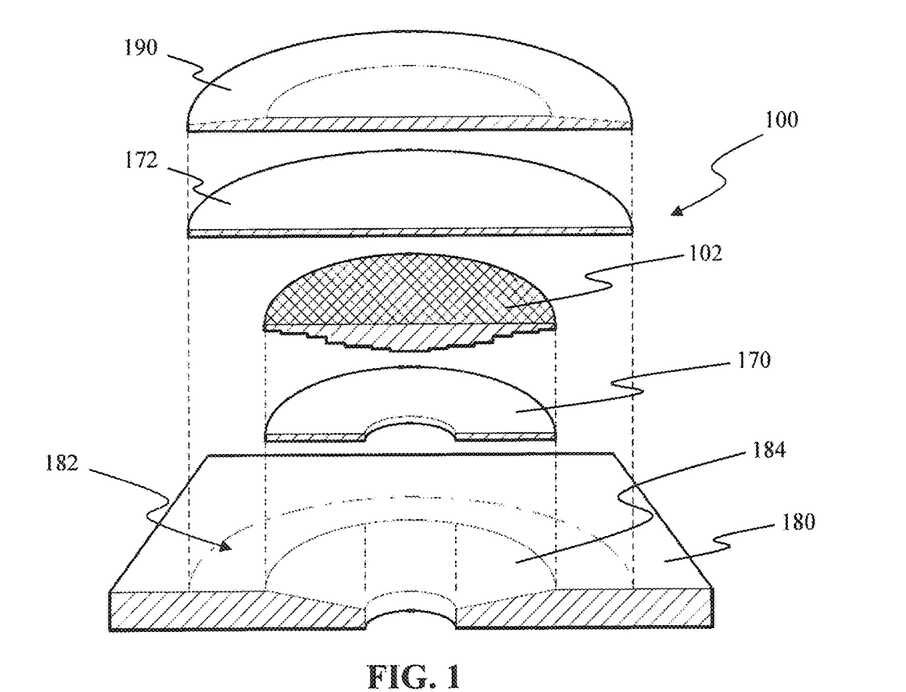
FIG. 1 is a schematic perspective section view of a patch according to a preferred embodiment of the invention being applied to a structure.
Figure 2:
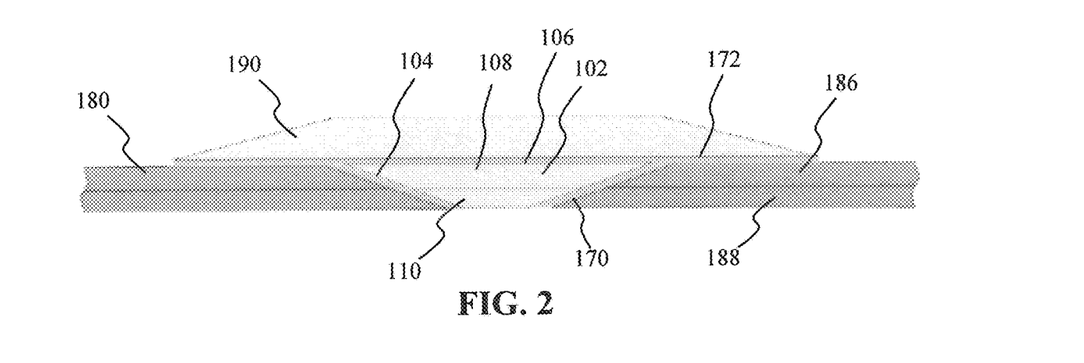
FIG. 2 is a schematic side section view of the patch of FIG. 1.

FIG. 1 shows a patch 100 according to a preferred embodiment of the invention being applied to a structure 180 having a defect 182, for example an airframe of an aircraft, or other aerospace applications. As shown in FIG. 2, the patch 100 includes a patch body 102. The patch body 102 includes a bonding surface 104 where, when applied, the patch body 102 interfaces with the structure 180, the structure 180 having, in some embodiments, at least a first structural layer 186 and a second structural layer 188, and a patch surface 106. The patch body 102 has a variable porosity and a set of material properties, wherein at least one material property, for example Young's Modulus, is controlled by the variable porosity.

Figure 3:
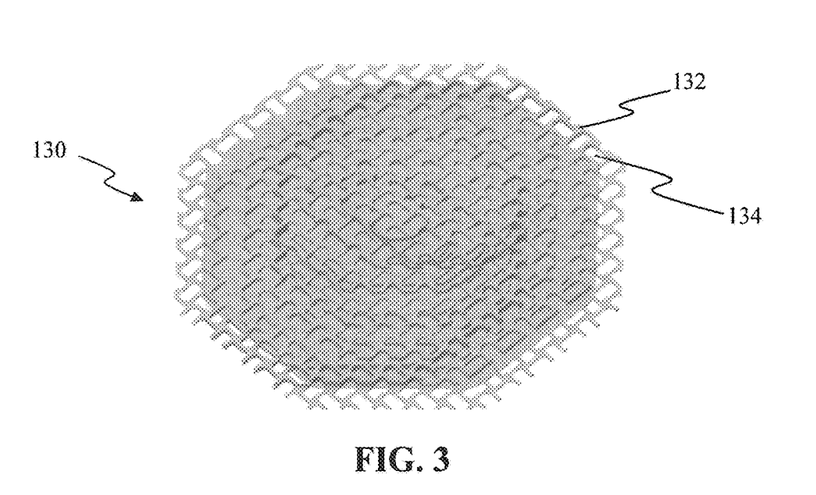
FIG. 3 is a schematic view of a metallic cellular lattice material used in the manufacture of the patch of FIG. 1.

The variable porosity may be varied continuously throughout the patch body 102, or according to predetermined portions, such as a first zone, in this case a first patch layer 108, and a second zone, in this case a second patch layer 110 located between the bonding surface 104 and the patch surface 106. As shown in FIG. 3, each layer 108, 110 includes a metallic cellular lattice material 130 manufactured at least partially using additive layer manufacturing from, for example Invar 36 or Ti-6Al-4V. Invar 36 is iron alloyed with 36 wt % nickel, while Ti-6Al-4V is titanium alloyed with 6 wt % Aluminium and 4 wt % Vanadium. In another embodiment, the cellular lattice material 130 is manufactured at least partially using Ti-6Al-4V ELI (Grade 23, or Extra Low Interstitials), which contains reduced levels of oxygen, nitrogen, carbon, and iron. The cellular lattice material 130 includes a metal lattice 134 surrounding a plurality of voids 132. As a result, each layer 108, 110 has a porosity determined by the volumetric proportion of the voids 132 compared to the volumetric proportion of the metal lattice 134. Each layer 108, 110 also has a set of material properties, such as Young's modulus, Poisson's ratio, yield strength, ultimate tensile strength, and coefficient of thermal expansion.

Figure 7:
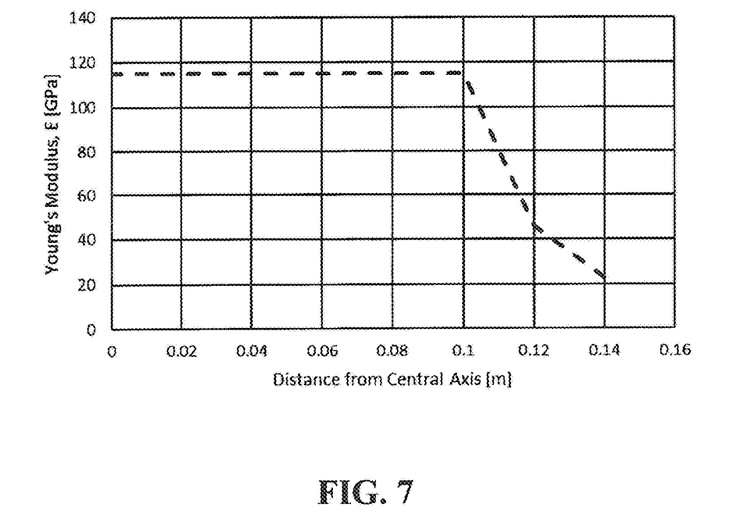
FIG. 7 is a diagram showing the stiffness of the patch of FIG. 6 as a function of distance from a central axis.
Figure 8:
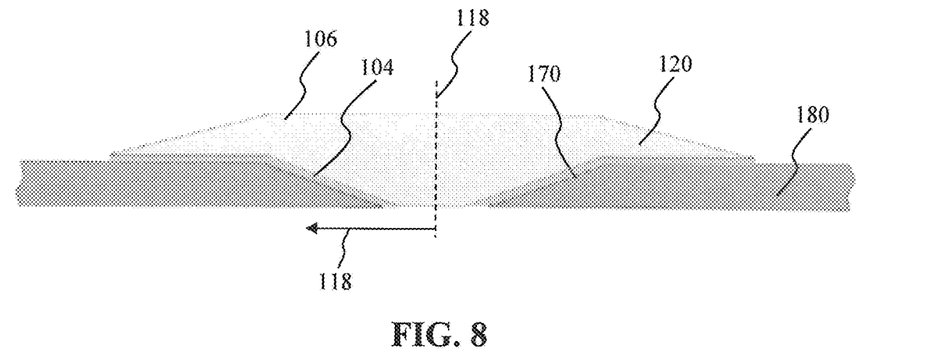
FIG. 8 is a schematic side section view of a patch according to another embodiment of the invention.
Figure 9:
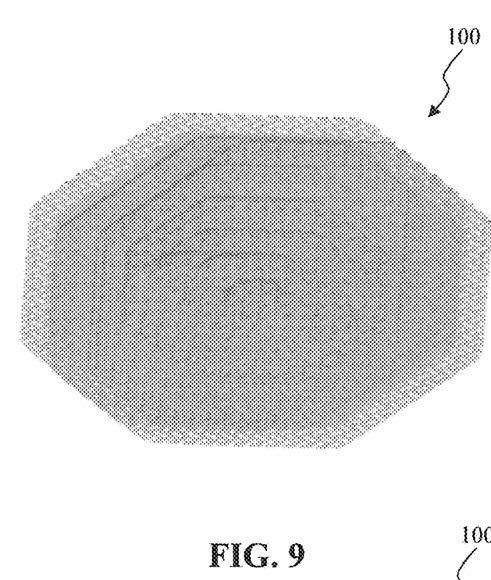
FIG. 9 is a schematic bottom view of the patch of FIG. 1.
Figure 10:
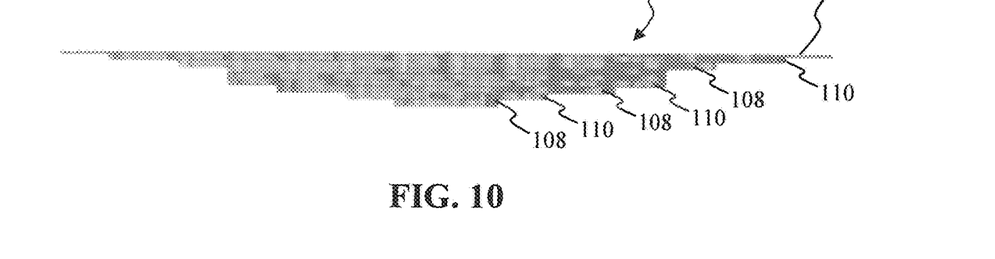
FIG. 10 is a schematic side section view of the patch of FIG. 9.
Figure 11:
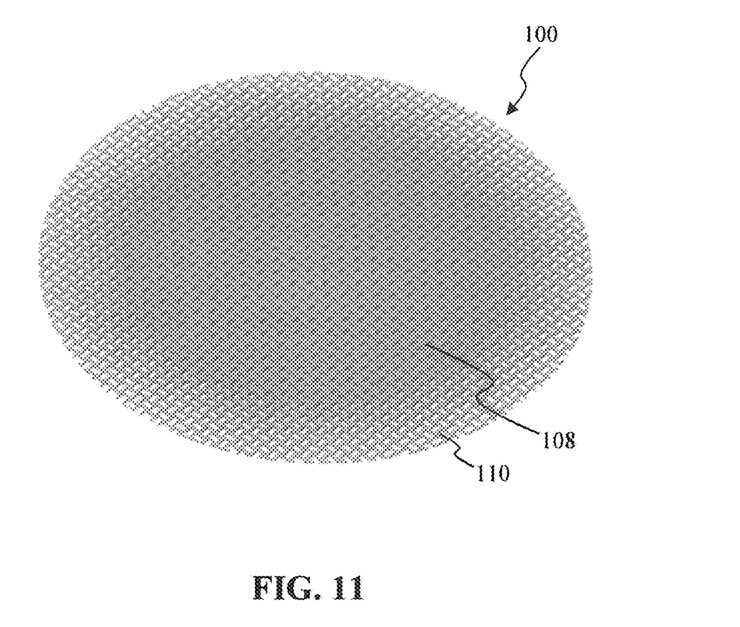
FIG. 11 is a schematic bottom view of a patch according to another embodiment of the invention.
Figure 12:
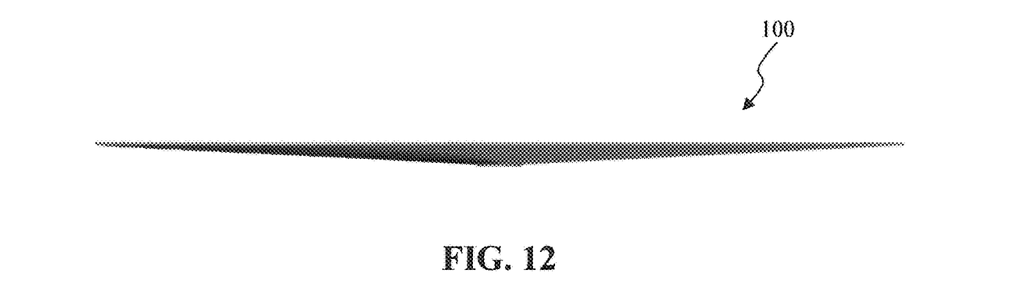
FIG. 12 is a schematic side section view of the patch of FIG. 11.

The layers 108, 110 of the patch body 102 may be dimensioned in thickness, so that the patch 100 conforms with the defect topography 184 of the defect 182. For example, as shown in FIGS. 7 and 8, the defect topography 184 may include distinct steps between a number of structural layers 186, 188, for example when the structure 180 is a composite structure. Thus, the layers 108, 110 of the patch 100 are dimensioned accordingly. Alternatively, the structure 180 may be of a homogenous material, for example a metallic material. In this case, the layers 108, 110 may be dimensioned to be very thin, and have tapered edges, as shown in FIGS. 9 and 10, to conform to the defect topography 184 of the defect 182 in the structure 180.

The use of the patch 100 may further includes the use of a doubler 190. The doubler 190 is not typically adapted to a particular defect 182 in a particular structure 180, but is a generic component applied over the tailored patch 100.

Figure 4:
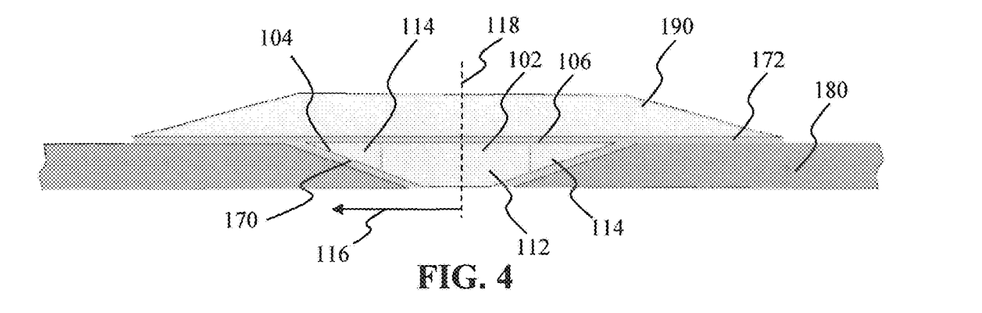
FIG. 4 is a schematic side section view of a patch according to another embodiment of the invention being applied to the structure.

In another embodiment, as shown in FIG. 4, the first zone of the patch body 102 includes a first radial portion 112, and the second zone includes a second radial portion 114, each portion 112, 114 being located at a distance 116 from a central axis 118 of the patch 100. As can be seen in FIG. 4, the second radial portion 114 is located further from the central axis 118 than the first radial portion 112. As in the embodiment of FIG. 2, each portion 112, 114 is at least partially manufactured using additive layer manufacturing and includes the metallic cellular lattice material 130. Accordingly, each portion 112, 114 has a porosity and a set of material properties. In the preferred embodiment, the porosity of the second radial portion 114 is higher than the porosity of the first radial portion 112. In another preferred embodiment, the patch body 102 includes a third radial portion (not shown) having a higher porosity than both the first and second radial portions 112, 114.

Figure 5:
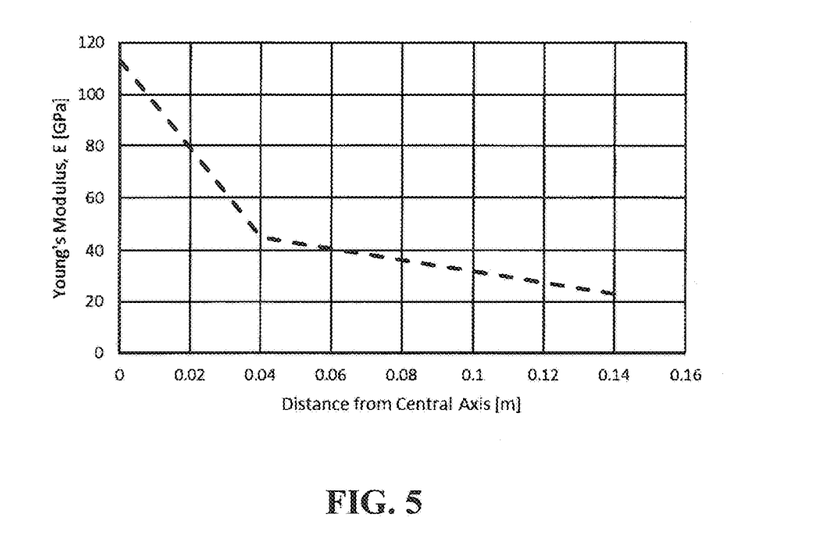
FIG. 5 is a diagram showing the stiffness of the patch of FIG. 4 as a function of distance from a central axis.

Additionally, as shown in FIG. 5, in the preferred embodiment the variable porosity of the patch body 102 is predetermined so as to vary as a function of distance from the central axis 118. Specifically, in an example where the patch 100 is manufactured from Ti-6Al-4V, the porosity of the first portion 112 is predetermined such that Young's modulus of the first portion 112 varies from 113 GPa at the central axis 118 to 45 GPa at the furthest extent of the first portion 112. Similarly, the porosity of the second portion 114 is predetermined such that Young's modulus of the second portion 114 varies from 45 GPa to 23 GPa at the furthest extent of the second portion 114 from the central axis 118.

Figure 6:
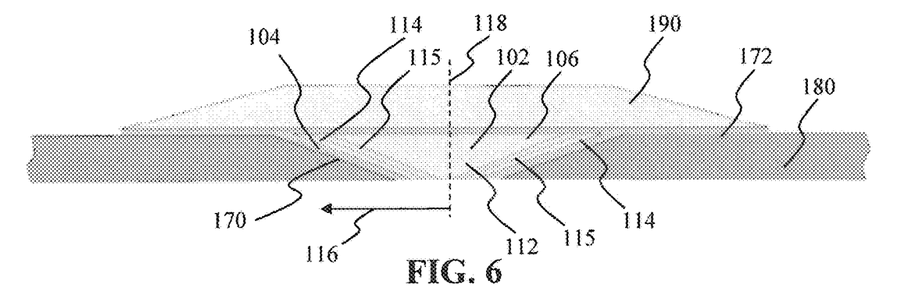
FIG. 6 is a schematic side section view of a patch according to another embodiment of the invention being applied to the structure.

In another embodiment, as shown in FIG. 6, the patch body 102 includes a third radial portion 115 intermediate the first radial portion 112 and the second radial portion 114. Similarly to radial portions 112, 114, the third radial portion has a variable porosity that is predetermine, as shown in FIG. 7. Preferably, the porosity of the third radial portion 115 is predetermined such that the Young's modulus of the third radial portion 115 is in the range between the Young's modulus of the first portion 112 and the second portion 114. In a preferred embodiment, the Young's modulus of the second radial portion 114 and third radial portion 115 is 20% and 40% of the Young's modulus of the first radial portion 112, respectively.

In another embodiment, shown in FIG. 8, instead of using the doubler 190, the patch body 102 includes a doubler portion 120. The doubler portion 120 is also manufactured from the metallic cellular lattice material 130 and thus the doubler portion 120 may also have a porosity and a set of material properties, with at least one material property of the doubler portion being predetermined by the porosity.

In the embodiments of FIGS. 2, 4, 6, and 8 the patch surface 106 has a substantially smooth surface, compared to a higher surface porosity of the bonding surface 104 that is due to the manufacture of the patch body 102 from the metallic cellular lattice material 130. The patch surface 106 is smooth to match the surface quality of the surrounding structure 180.

Figure 14:
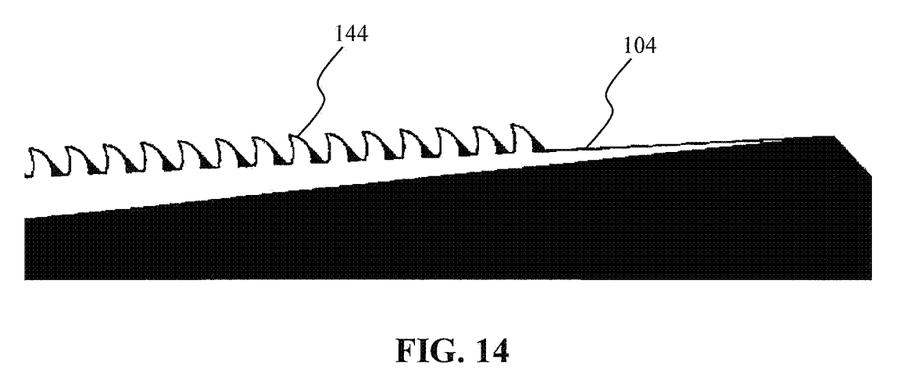
FIG. 14 is a schematic side section view of a patch according to another embodiment of the invention.
Figure 15:
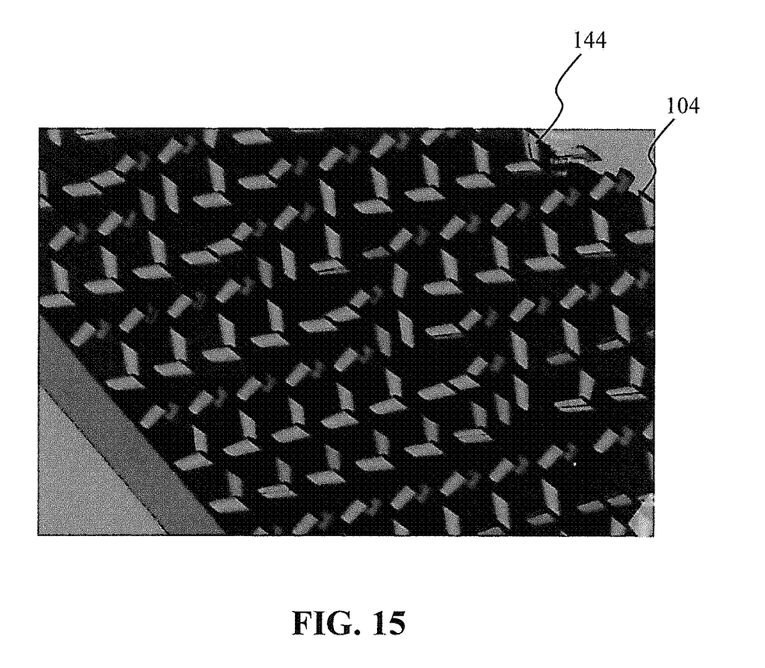
FIG. 15 is a schematic isometric view of a patch according to another embodiment of the invention.

In some embodiment, as shown in FIGS. 14 and 15, the bonding surface 104 has a surface feature 144 for increasing a surface area of the bonding surface 104 to improve adhesion to the adhesive layer 170. In one embodiment, shown in FIG. 14, the surface feature 144 includes a hook 144, or an extrusion or prism with a hook-shaped cross-section, extending from the bonding surface. In another embodiment, as shown in FIG. 15, the surface feature 144 includes a plurality of cones 144 extending from the bonding surface 104.

Figure 16:
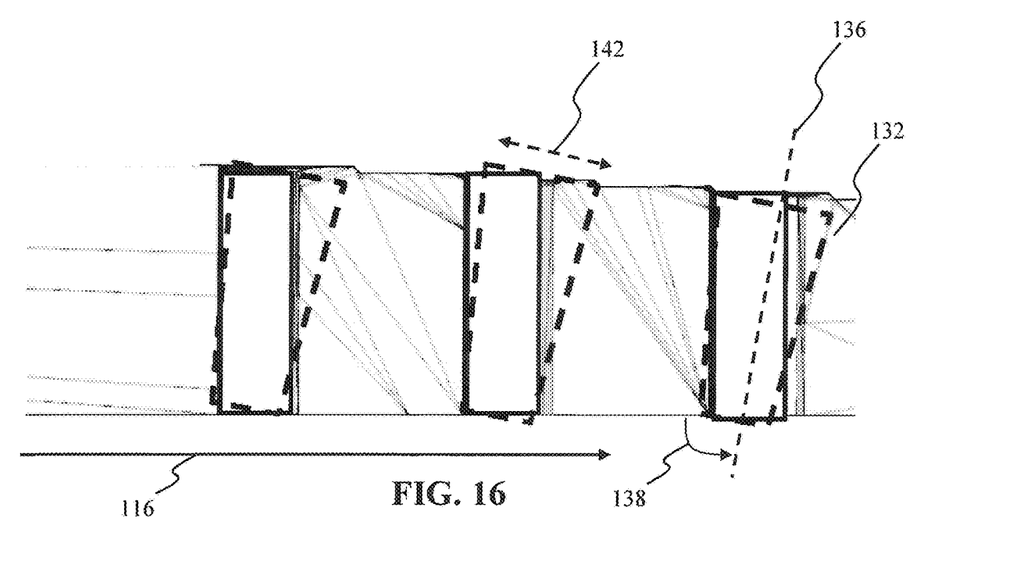
FIG. 16 is a schematic side section view of a patch according to another embodiment of the invention.

As seen in FIG. 16, each void 132 has a void axis 136. In one embodiment, the void axis 136 is transverse to the patch surface 106 by a void angle 138, preferably the void angle is about 3°. In another embodiment the void angle 138 varies as a function of the distance 116 from the central axis 118, for example the void angle 138 varies linearly from 0° adjacent the central axis 118 to 3° at a maximum of the distance 116 from the central axis 118.

Figure 17:
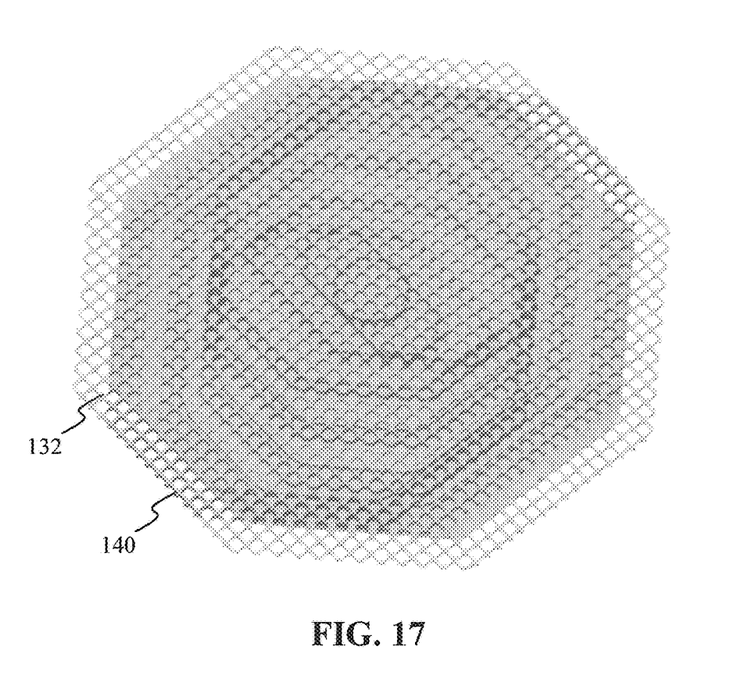
FIG. 17 is a schematic bottom view of a patch according to another embodiment of the invention.

In one embodiment, the metal lattice 134 includes a honeycomb structure 140, as seen in FIG. 17. The honeycomb structure 140 may be an arrangement of six adjacent voids 132 surrounding each void 132 (forming a hexagonal honeycomb structure 140), or an arrangement of 4 adjacent voids 132 surrounding each void 132 (forming a rectangular honeycomb structure 140). In preferred embodiments, a major cross-sectional dimension 142 which, as shown in FIG. 16, is the largest cross-sectional dimension of a void 132 in a plane of the patch surface does not exceed 1 mm.

Use of the patch 100 will now be discussed.

Figure 13:
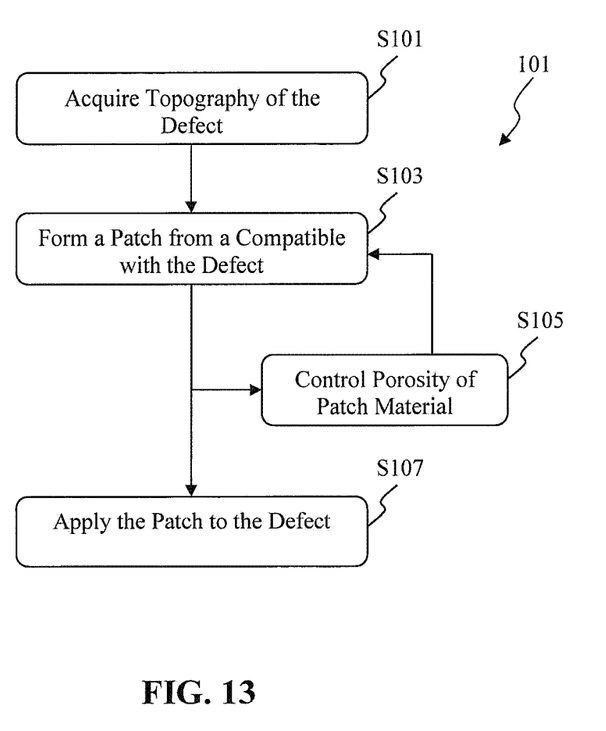
FIG. 13 is a flow diagram of a method according to a preferred embodiment of the invention.

As shown in FIG. 13, a method 101 for defect repair according to a preferred embodiment of the present invention starts at step S101 by acquiring the defect topography 184. Acquisition of the defect topography 184 may be performed by methods such as laser scanning, air-coupled ultrasound, gel-coupled ultrasound, visual inspection, X-ray, and the like. For clarification, the defect 182 and the defect topography 184 refer to the defect 182 in the state where the defect 182 is ready to receive the patch 100. The method 101 is agnostic of whether removal of material has occurred or not, provided that the defect topography 184 is such that the patch 100 can be applied. In the preferred embodiment, step S101 also includes acquiring information related to a set of material properties of a first structural layer 186 and a second structural layer 188, shown in FIG. 2.

The method 101 continues, at step S103, forming the patch 100 from, for example, Invar 36 or Ti-6Al-4V. Step S103 is preferably performed using Selective Laser Melting and Laser Metal Deposition additive layer manufacturing methods to create the cellular lattice material 130 having the metal lattice 134 surrounding a plurality of voids 132. During the execution of step S103, at step S105, the porosity of the cellular lattice material 130 is adjusted by adjusting the control parameters of the additive layer manufacturing methods to change dimensional parameters, such as the size and/or shape of the voids 132 and the size and/or shape of the metal lattice 134 of the metallic cellular lattice material, to increase or decrease the volume of the metal lattice 134 compared to the plurality of voids 132. Thereby the variable porosity and thus a material property of the current zone of the patch 100 being formed is adjusted, thereby creating the first zone, such as the first patch layer 108 or the first radial portion 112, and the second zone, such as the second patch layer 110 or the second radial portion 114, each zone having a set of material properties wherein at least one material property is different between the first zone and the second zone.

In a preferred embodiment, the porosity of the first patch layer 108 is adjusted such that at least one material property of the first patch layer 108 is more compatible with the first structural layer 186 than the second structural layer 188. Similarly, the porosity of the second patch layer 110 is adjusted such that at least one material property of the second patch layer 110 is more compatible with the second structural layer 188 than the first structural layer 186. For example, it may be desirable to match the anisotropic Young's modulus of each layer in a carbon fibre reinforced plastic (CFRP), or its anisotropic yield properties.

More preferably, the porosity of the first patch layer 108 is adjusted such that at least one material property of the first patch layer 108 is substantially similar to the same material property of the first structural layer 186. Similarly, the porosity of the second patch layer 110 is adjusted such that at least one material property of the second patch layer 110 is substantially similar to the same material property of the second structural layer 188.

Figure 18:
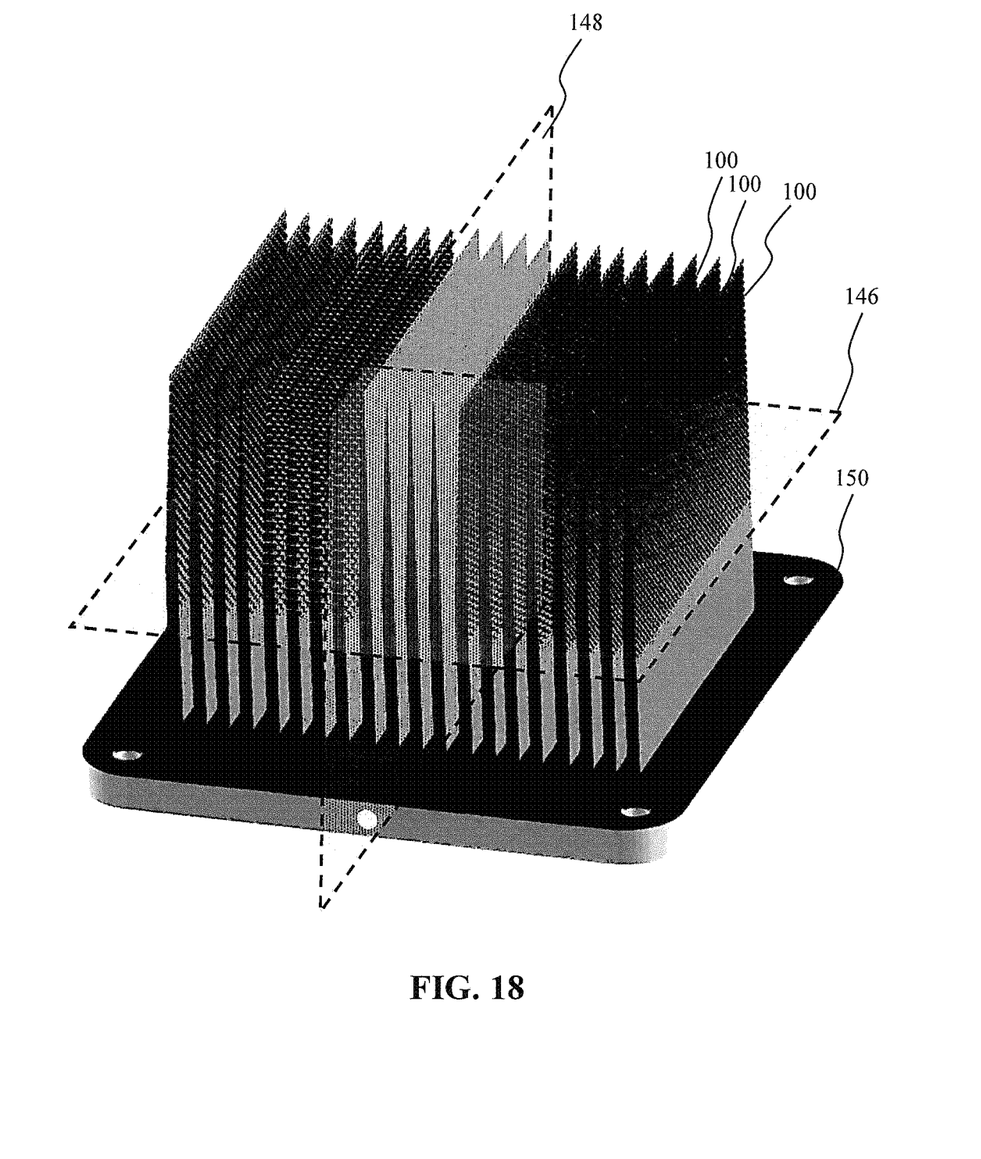
FIG. 18 is a schematic perspective view of a base to which a plurality of patches of FIGS. 1 to 17 is connected.

In a preferred embodiment step S103 includes forming a plurality of patches 100 in a single additive layer manufacturing process, using a base 150 to which each patch 100 is connected, as shown in FIG. 18. The additive layer manufacturing process deposits layers of material in a first plane 146 (and subsequent like parallel planes). The patch body 102 being formed extends substantially in a second plane 148, the second plane 148 being substantially perpendicular to the first plane 146.

At step S107, after the patch 100 has been successfully formed, the patch 100 is applied to the defect 182 in the structure 180. As shown in FIGS. 2, 4, and 6, a variety of functional designs are possible for the patch 100. Generally, it is possible to apply the patch 100 according to FIGS. 2 and 4, with a doubler 190, or to apply the patch 100 according to FIG. 8, in which case the patch 100 has a doubling portion 120. In the case of FIGS. 2 and 4, a first adhesive layer 170 is applied so as to be located between the patch 100 and the defect topography 184. In a preferred embodiment, prior to application of the first adhesive layer 170, the bonding surface 104 is treated by grit-blasting with dry nitrogen, and a silane surface treatment. Depending on the adhesive compound used in the adhesive layer 170, the adhesive layer 170 may be cured, or the doubler 190 may be applied immediately after. The application of the doubler 190 includes application of a second adhesive layer 172 such that it is located between the doubler 190 and the structure 180, as well as the patch surface 106. The adhesive of the second adhesive layer 172 is then cured. In the case of FIG. 8, the first adhesive layer 170 is applied so as to be located between the patch 100 and the defect topography, as well as between the doubler portion 120 of the patch 100 and the structure 180. The adhesive of the first adhesive layer 170 is then cured.

Advantages of the patch 100 will now be discussed.

Because the porosity of the first zone and the second zone can be controlled such that at least one material property is different between the first zone and the second zone, the patch 100 can accommodate materials with anisotropic properties and/or create locally compliant portions to smoothly transfer loads and decrease the risk of adhesive failure between the portion 100 and the structure 180.

When embodied as the first and second patch layers 108, 110, the zones allow improved compatibility between the material properties of the structure 180 and the patch 100.

When embodied as the first and second radial portions 112, 114, the zones allow smooth transfer of out-of-plane loads between the structure 180 and the patch 100, decreasing the risk of local adhesive failure, and thus potential for a snowball-effect of a decreased load-transfer surface, akin to thread-failure in threaded connections. Thus, it is desirable to create a more compliant material at the radially outward portion, and a less compliant material for the remainder of the patch 100 to maintain dimensional stability.

When a third radial portion 115 is formed between the first and second portions 112, 114, the material properties of the patch 100 can be varied more smoothly between the design requirements at a perimeter of the patch 100, compared to close to the central axis 118.

Because the material properties of the patch 100 are controlled using the porosity of the metallic cellular lattice material 130, it is possible to change the material properties at much faster rates, compared to, for example, heat treatments. In the preferred embodiment, for example, Young's modulus may be varied at a rate up to 17 GPa $mm^{-1}$.

The bonding surface 104 also has a porosity, due to the patch body 102 being manufactured from the metallic cellular lattice material 130. The porosity of the bonding surface 104 may be specifically controlled so as to improve the adhesive bond between the patch 100 and the structure 180.

Forming the patch 100 from Invar 36 or Ti-6Al-4V allows closer matching of thermal expansion coefficients with CFRP materials, while allowing use of these materials at relatively low part density, due to the inclusion of voids 132 in the material. Thus, while Invar 36 and Ti-6Al-4V both have relatively high bulk material density, the inclusion of the voids 132 allows manufacture of parts with relatively low effective density, which is desirable for aerospace applications. The use of Extra Low Interstitial Ti-6Al-4V (Grade 23) provides improved ductility and fracture toughness, which is advantageous in aerospace applications.

The voids 132 having a void angle 138 is beneficial for additive layer manufacturing of cavities, and may also improve stress paths in the patch 100. Variation of the void angle 138 as a function of a distance from a centre of the patch body 102 may also improve stress paths in the patch 100.

The metal lattice 134 having a form of a honeycomb 140 or a gyroid 140 structure improves the structural performance of the metal lattice 134 while using a low amount of metal material, compared to other structural configurations of a metal lattice.

The use of voids 132 with a major cross-sectional dimension being less than 1 mm allows better and detailed control of the porosity, and thereby the material properties, of the patch body 102.

The use of surface features 144, such as the hooks or the cones, improves the adhesion between the adhesive layer 170 and the bonding surface 104.

The additive manufacturing of the patch 100 such that it extends substantially perpendicularly to the first plane 146 reduces bending of the patch 100 as it is formed. This allows formation of voids 132 with cleaner, more controllable, surfaces, and thereby improved control of porosity and material properties.

REFERENCE NUMERALS

| | |
|---|---|
| 100 | patch |
| 101 | method |
| 102 | patch body |
| 104 | bonding surface |
| 106 | patch surface |
| 108 | first patch layer |
| 110 | second patch layer |
| 112 | first radial portion |
| 114 | second radial portion |
| 116 | distance |
| 118 | central axis |
| 120 | doubler portion |
| 130 | metallic cellular lattice material |
| 132 | voids |
| 134 | metal lattice |
| 136 | void axis |
| 138 | void angle |
| 140 | honeycomb structure |
| 142 | major cross-sectional dimension |
| 144 | surface feature |
| 146 | first plane |
| 148 | second plane |
| 150 | base |
| 170 | first adhesive layer |
| 172 | second adhesive layer |
| 180 | structure |
| 182 | defect |
| 184 | defect topography |
| 186 | first structural layer |
| 188 | second structural layer |
| 190 | doubler |

The invention claimed is:

1. A patch for repair of a composite structure with a defect having a topography, the patch including:
    a patch body that is at least partially metallic;
    a bonding surface that is compatible with the topography of the defect; and
    a patch surface opposite the bonding surface,
    wherein the patch body includes a metallic cellular lattice material consisting of metal, the metallic cellular lattice material surrounding a plurality of voids, the patch body having a variable porosity and a set of material properties, wherein the variable porosity is provided by differing volumetric proportions of the voids compared to volumetric proportions of the metallic cellular lattice material within the patch body;
    wherein the variable porosity is adjusted such that at least one thermal material property and at least one mechanical material property of a set of thermal and mechanical material properties of the patch is anisotropic and substantially similar to a corresponding set of thermal and mechanical material properties of a structural layer of the defect in that the patch body is locally compliant with the composite structure for smooth transfer of loads between the composite structure and the patch and decreased risk of failure of an adhesive adhered to the bonding surface for adhesion of the patch to the composite structure;
    wherein the bonding surface has a surface feature for increasing a surface area of the bonding surface to improve adhesion to the adhesive; and
    wherein the surface feature is at least one of:
        a hook extending from the bonding surface, an extension with a hook-shaped cross-section extending from the bonding surface, or a plurality of cones extending from the bonding surface.

2. The patch of claim 1, wherein the patch body includes a first zone and a second zone, each zone having:
    a porosity; and
    a set of thermal and mechanical material properties,
    wherein the porosity of the first zone is different to the porosity of the second zone, and as a result, at least one thermal material property of the first zone and at least one mechanical material property of the first zone are different to the thermal and mechanical material properties of the second zone.

3. The patch of claim 2, wherein the first zone includes a first patch layer and the second zone includes a second patch layer, the first and second patch layers being located between the bonding surface and the patch surface, wherein each patch layer is configured so as to be located, when the patch is applied to the composite structure, adjacent a corresponding structural layer of the composite structure, and
    wherein a porosity of each patch layer is predetermined so that:
        at least one thermal material property and at least one mechanical material property of the first patch layer is more compatible with a first structural layer than a second structural layer; and
        at least one thermal material property and at least one mechanical material property of the second patch layer is more compatible with the second structural layer than the first structural layer.

4. The patch of claim 2, wherein the first zone includes a first radial portion and the second zone includes a second radial portion, the first and second radial portions being located at different distances from a central axis of the patch.

5. The patch of claim 4, wherein the second radial portion is located further from the central axis than the first radial portion, and wherein the porosity of the second radial portion is higher than the porosity of the first radial portion.

6. The patch of claim 4, wherein the patch further includes a third radial portion intermediate the first and second radial portions, and wherein a porosity of the third radial portion is in a range between the porosity of the first radial portion and the porosity of the second radial portion.

7. The patch of claim 1, wherein the patch body includes:
a doubler portion configured to, when the patch is applied to the composite structure, extend beyond the topography of the defect.

8. The patch of claim 7, wherein the doubler portion has a porosity and a set of thermal and mechanical material properties, and wherein at least one material property of the doubler portion is predetermined by the porosity.

9. The patch of claim 1, wherein the volumetric proportion of the voids and/or the volumetric proportion of the metallic cellular lattice material is predetermined to control the variable porosity.

10. The patch of claim 1, wherein the voids have a void axis that is transverse to the patch surface by a void angle.

11. The patch of claim 1, wherein a major cross-sectional dimension of a majority of voids in the plurality of voids has a magnitude of less than 1 mm.

12. The patch of claim 1, wherein the variable porosity is predetermined so as to vary as a function of distance from a central axis.

13. The patch of claim 1, wherein the patch surface has a predetermined surface porosity of about 80 percent.

14. The patch of claim 1, wherein the at least one mechanical material property is a Young's Modulus and wherein the Young's Modulus varies at a rate between 220 GPa m$^{-1}$ to 1700 GPa m$^{-1}$.

15. A patch for repair of a composite structure with a defect having a topography, the patch including:
a patch body that includes a metallic cellular lattice material consisting of metal, the metallic cellular lattice material surrounding a plurality of voids;
a bonding surface that is compatible with the topography of the defect; and
a patch surface opposite the bonding surface;
wherein the patch body has a variable porosity and a set of material properties, the variable porosity being provided by differing volumetric proportions of the voids compared to volumetric proportions of the metallic cellular lattice material within the patch body; and
wherein the variable porosity is adjusted such that at least one thermal material property and at least one mechanical material property of a set of thermal and mechanical material properties of the patch is anisotropic and substantially similar to a corresponding set of thermal and mechanical material properties of a structural layer of the defect in that the patch body is locally compliant with the composite structure for smooth transfer of loads between the composite structure and the patch and decreased risk of failure of an adhesive adhered to the bonding surface for adhesion of the patch to the composite structure.

* * * * *